US010535066B2

(12) United States Patent
Goldfarb et al.

(10) Patent No.: US 10,535,066 B2
(45) Date of Patent: Jan. 14, 2020

(54) SYSTEMS AND METHODS FOR SECURING PINS DURING EMV CHIP AND PIN PAYMENTS

(71) Applicant: PayPal, Inc., San Jose, CA (US)

(72) Inventors: Sivanne Goldfarb, San Jose, CA (US); Narik Patel, San Jose, CA (US); Michael Voege, San Jose, CA (US); Ali Minaei Moghadam, San Jose, CA (US); Satish Govindarajan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 697 days.

(21) Appl. No.: 14/268,749

(22) Filed: May 2, 2014

(65) Prior Publication Data

US 2014/0372320 A1 Dec. 18, 2014

Related U.S. Application Data

(60) Provisional application No. 61/836,084, filed on Jun. 17, 2013.

(51) Int. Cl.
G06Q 20/40 (2012.01)
G06Q 20/38 (2012.01)
(Continued)

(52) U.S. Cl.
CPC ......... *G06Q 20/4012* (2013.01); *G06Q 20/20* (2013.01); *G06Q 20/356* (2013.01); *G06Q 20/382* (2013.01); *G07F 7/1033* (2013.01)

(58) Field of Classification Search
None
See application file for complete search history.

(56) References Cited

U.S. PATENT DOCUMENTS 6,598,032 B1 * 7/2003 Challener ............ G06Q 20/382
705/64
2001/0054142 A1 * 12/2001 Van Blarkom ...... G06F 21/6254
713/151

(Continued)

FOREIGN PATENT DOCUMENTS

GB  2410821 A  8/2005
WO  0048076 A1  8/2000

OTHER PUBLICATIONS

Extended European Search Report, dated Feb. 1, 2017, corresponding European application No. EP 14 813 609.6.

*Primary Examiner* — Jay Huang
*Assistant Examiner* — Gabriel Mercado
(74) *Attorney, Agent, or Firm* — Haynes and Boone, LLP

(57) ABSTRACT

In transactions between a consumer and a merchant (or other third party) using services of a payment provider (e.g., credit card company, or financial services provider), methods and systems are provided for enabling any third party to accept chip and PIN payment and payment provider services using a payment provider device that is enabled using the third party's own application (referred to herein as "app") and not the app of the payment provider. Enabling a merchant to accept chip and PIN payments usually requires the merchant to certify (accredit) their application (e.g., a point-of-sale (POS) system) end to end with the payment providers (e.g., Visa, MasterCard). A software development kit (SDK) modification to the application allows the merchant to accept chip and PIN cards the without the need to certify the application. The SDK includes the functionality that needs to be certified, and certifies it once with a service provider.

21 Claims, 8 Drawing Sheets

(51) Int. Cl.
 *G06Q 20/20* (2012.01)
 *G06Q 20/34* (2012.01)
 *G07F 7/10* (2006.01)

(56) References Cited

U.S. PATENT DOCUMENTS

| | | | |
|---|---|---|---|
| 2004/0026496 A1* | 2/2004 | Zuili | G06Q 20/341 235/379 |
| 2004/0073813 A1 | 4/2004 | Pinkas | |
| 2004/0103147 A1* | 5/2004 | Flesher | G06F 17/30168 709/204 |
| 2004/0127256 A1* | 7/2004 | Goldthwaite | G06K 7/0004 455/558 |
| 2004/0165724 A1* | 8/2004 | Choi | H04L 9/0836 380/45 |
| 2007/0097076 A1* | 5/2007 | Gross | G06F 21/31 345/163 |
| 2009/0177495 A1* | 7/2009 | Abousy | G06F 19/345 705/3 |
| 2009/0307142 A1* | 12/2009 | Mardikar | G06Q 20/1085 705/72 |
| 2011/0047036 A1* | 2/2011 | Foran-Owens | G06Q 20/204 705/17 |
| 2011/0287726 A1 | 11/2011 | Huang | |
| 2012/0289188 A1* | 11/2012 | Marcus | G06Q 20/12 455/406 |
| 2013/0067208 A1 | 3/2013 | Brinkman et al. | |
| 2013/0144792 A1* | 6/2013 | Nilsson | G06Q 20/20 705/67 |
| 2013/0328801 A1* | 12/2013 | Quigley | G06Q 20/3674 345/173 |
| 2013/0340057 A1* | 12/2013 | Kitlyar | G06F 21/36 726/6 |
| 2014/0061298 A1* | 3/2014 | Fasoli | G06Q 20/206 235/380 |
| 2015/0161409 A1* | 6/2015 | Szebeni | G06F 21/6272 713/165 |
| 2015/0317498 A1* | 11/2015 | Gustafsson | G06Q 20/32 235/440 |

\* cited by examiner

SYSTEMS AND METHODS FOR SECURING PINS DURING EMV CHIP AND PIN PAYMENTS

CROSS REFERENCE TO RELATED APPLICATIONS

This application claims benefit of priority from U.S. Provisional Application No. 61/836,084, filed Jun. 17, 2013, which is hereby incorporated by reference.

BACKGROUND

Field of the Invention

Embodiments of the present invention generally relate to making secure payments using cash substitutes at a point of sale (POS) and, more particularly, to making payments securely with a personal identification number (PIN) using chip-based payment cards such as the EMV card.

Related Art

Integrated circuit (IC) cards, also known as "Chip and PIN" cards or Europay, MasterCard and Visa (EMV) cards have become the standard financial transaction cards, also known as credit or debit cards, that are used in Europe. EMV (Europay, MasterCard and Visa) is a global standard for inter-operation of integrated circuit cards (IC cards or "chip cards") and IC card capable point of sale (POS) terminals and automated teller machines (ATMs), for authenticating credit and debit card transactions for payments. EMV payments can be processed through chip and PIN, in which a payment card that includes an embedded smart card is first read at the POS and then the user enters a PIN for authentication, typically using a keypad on the POS terminal, and commonly referred to as "chip and PIN payments".

Modern mobile devices are capable of acting as POS terminals using a card reader in communication with the mobile device, such as the PayPal Here™ card reader device offered by PayPal of San Jose, Calif. However, most card readers including the PayPal Here™ card readers are currently only able to process traditional magnetic stripe financial transaction cards. Efforts to develop an IC chip reader for use with a mobile device have had difficulty in gaining approval and certification due to the inherent insecurity of the mobile device. For example, a mobile device may have malware executing on it, which may be designed to capture a user's PIN or other information from the IC chip that could be read by a plug-in IC chip reader.

Figure 1:
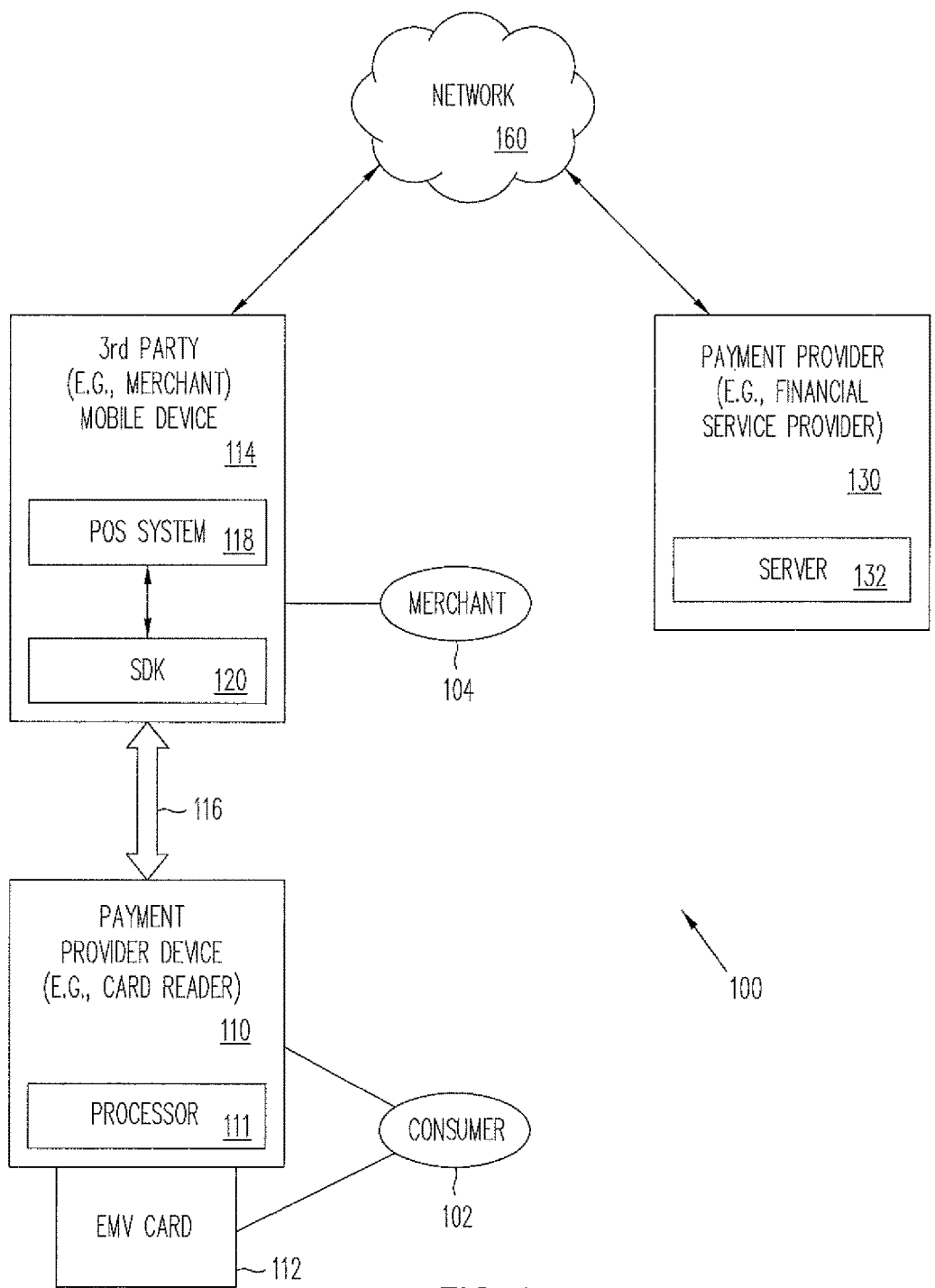
FIG. 1 is a block diagram of a system for providing consumer transactions, according to an embodiment.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

In transactions between a user (e.g., consumer), a payment provider (e.g., credit card company, or financial services provider such as a bank, credit union, or PayPal, Inc. of San Jose, Calif.) and a third party (e.g., a merchant), embodiments of the present disclosure enable any third party (typically someone wanting to sell goods or services, including merchants) to accept chip and PIN payment and payment provider services using a payment provider device (e.g., a card reader) that is enabled using the third party's own application (referred to herein as "app") and not the app of the payment provider.

In the current environment, in order to accept chip and PIN payments, the seller (typically a merchant) needs to certify, or accredit, their transaction processing (including, for example, point-of-sale (POS) systems, devices, and computer processing) end to end with the payment provider (e.g., credit card issuer such as Visa® or MasterCard®) which can mean a large overhead on sales—usually only large volume merchants can afford to do this. In one or more embodiments, a software development kit (SDK) is provided that can allow the merchant to accept chip and PIN card payments without the need to certify their transaction processing with the payment provider. For example, the SDK may include all the functionality that needs to be certified so that the functionality can be added to the third party app in a way that merchants cannot "break" the certification but retain the flexibility to use their own apps.

In general, a merchant or retailer that has invested in a POS system—such as by having a POS system on-site at each retail location that runs the cash registers and the chip and PIN devices attached to them—may wish to keep its own system rather than adopt a system of a particular payment provider that either 1) replaces the retailer's card readers and that part of the retailer's POS system that drives the card readers and keeps a ledger of payments received via the readers or 2) maintains a parallel system keeping track of transactions received via the particular payment or service provider. In one or more embodiments, methods and systems are provided to enable a payment provider's system to be integrated into the merchant's POS system, for example, by modifying the merchant's POS system using an SDK. For example, account records can be imported and consolidated from the merchant's POS system into the modified POS system, and the merchant's POS system can be adapted to drive the payment provider device (e.g., card reader) without the merchant having to use an app of the payment provider in order to use the payment provider device.

FIG. 1 is a block diagram of a system 100 for providing consumer transactions, according to an embodiment. System 100 may include a payment provider device 110 (also referred to as card reader 110) that may include an IC card capable reader processor 111 capable of reading an EMV card or other credit or debit card 112 for authenticating credit and debit card transactions for chip and PIN payments. Payment provider device 110 may also include a magnetic reader capable of reading conventional credit and debit cards. Card 112 may be presented by consumer 102 and may be inserted into or "swiped" on the reader (payment provider device 110) for payment of a transaction between consumer 102 and third party 104, referred to herein, without loss of generality, as "merchant" 104. Payment provider device 110 may be configured to receive and confirm a PIN or other verification from consumer 102 in order to authorize payment for the transaction.

Payment provider device 110 may be connected to or in communication with a third-party mobile device 114, referred to herein, without loss of generality, as "merchant mobile device" or more simply "merchant device" 114. Merchant device 114 may be, for example, a smartphone, a tablet, a POS terminal device, or any other electronic device capable of communicating with payment provider device (card reader) 110.

Payment provider device 110 may be connected to or communicate with merchant device 114, by any of several communication means 116. Communication means 116 may include, for example, an audio (headphone, microphone) jack and plug, a 24-pin connector or similar capable cable connection (e.g., 30 pin or lightening bold (Apple®)) as known in the art, a cable using either of the audio jack and plug or the 24-pin connector, or a wireless connection such as Bluetooth®, Bluetooth low energy (BLE), or Wi-Fi®. For example, by plugging the card reader 110 into a headphone jack (communication means 116) of a smartphone or tablet (e.g., merchant device 114) so that when a credit, debit, or EMV card is swiped through or read by the card reader 110, card reader 110 may read the card 112 data and convert it into an audio signal so that merchant device 114 (e.g., smartphone) can receive the signal, process the signal, and send it to third party application 118, referred to herein, without loss of generality, as "POS system" 118, executing on a processor of merchant device 114.

Third party application (POS system) 118 may take the card 112 data, which may be encrypted, and transmit it (using communication ability of third-party mobile device 114 such as Wi-Fi® or 3 or 4G Internet connection) via network 160 to back-end servers, such as server 132 of payment provider 130, which in turn may communicate with payment networks to complete the transaction.

Third party application (POS system) 118 may be modified by software development kit (SDK) 120 provided by payment provider 130 so that third party application 118 integrates functions that allow it to provide services from payment provider 130 that can facilitate transactions and payments between consumer 102 and merchant 104.

For example, SDK 120 may enable the third party (merchant) 104 to accept chip and PIN payments using payment provider device (card reader) 110—provided to the merchant 104 by payment provider 130—using the third party's own app (e.g., POS system 118) and not a specific, separate app provided by the payment provider 130 to interface third party mobile device 114 to payment provider device 110, as is currently typically necessary for other card reader devices. In order for merchant 104 to accept chip and PIN payments, the merchant is typically required to certify the merchant's transaction processing from end to end—e.g., from reading card 112 data to processing the transaction by payment provider server 132 and communicating with the payment networks—with the schemes such as Visa® and MasterCard®. SDK 120 may create an abstraction layer for modification of the third party's own app (e.g., POS system 118) that allows merchant 104 to include in POS system 118 all the functionality that needs to be certified in the SDK 120 (including, for example, some visual interactions) and certify the functionality once as being of the payment provider 130. The SDK 120 may effectively provide a way for the merchant to use the certification of the SDK 120 in the POS system 118 without "breaking" the certification yet retain the flexibility to use the merchant's own app (POS system) 118. Thus, SDK 120 may provide a solution for allowing the merchant to accept chip & PIN cards with the merchant's own POS system 118 without the need to certify the solution.

As described above, in one or more embodiments, the merchant's POS system 118 can be adapted (e.g., using SDK 120) to drive the payment provider device (e.g., card reader) 110 without the merchant 104 having to use an app of the payment provider 130 in order to use the payment provider device 110 and services of the payment provider 130.

Figure 2:
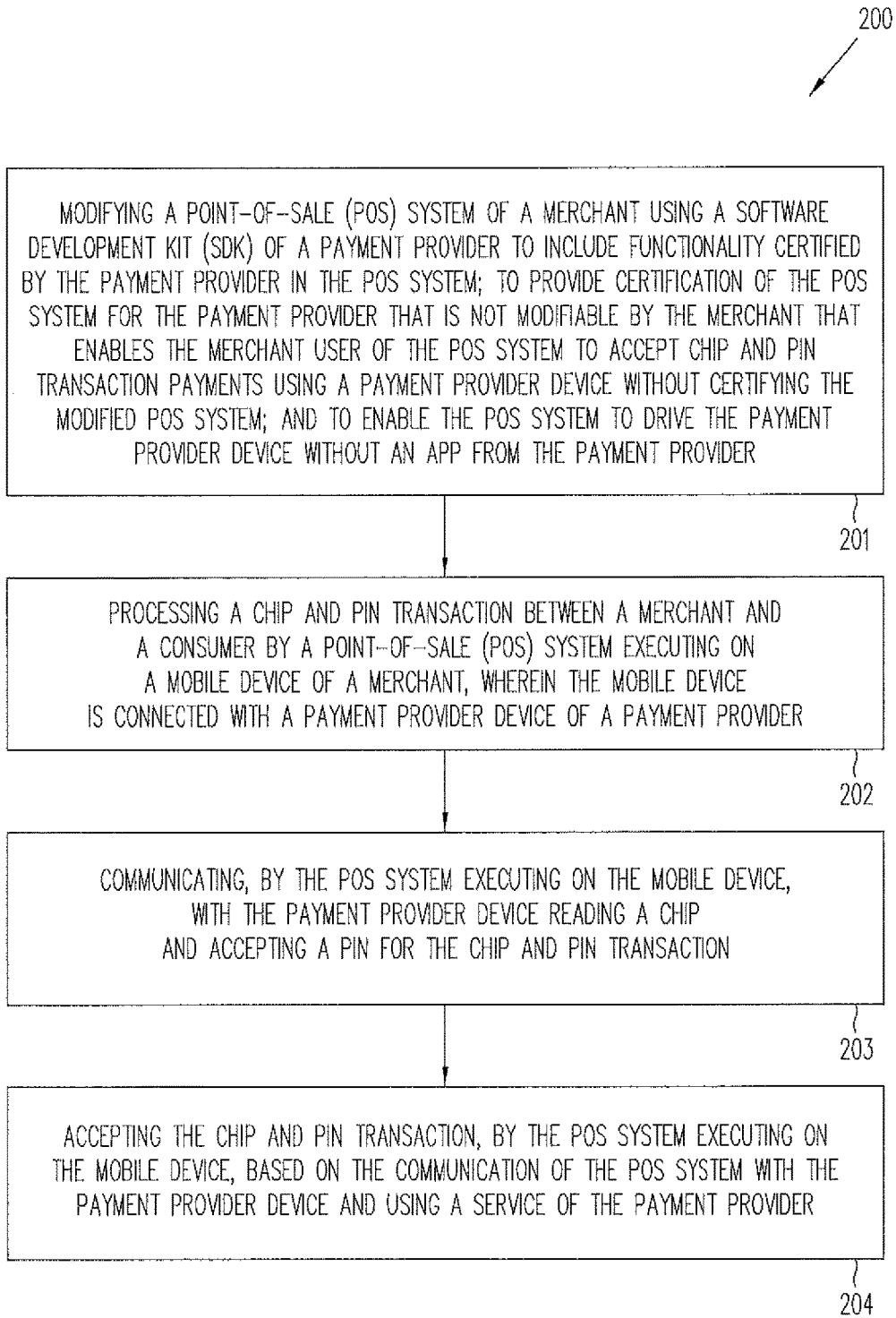
FIG. 2 is a flow diagram illustrating a method for providing consumer transactions, according to an embodiment.

FIG. 2 is a flow diagram illustrating a method 200 for providing consumer transactions, according to an embodiment. At a step 201 of method 200, a software development kit, such as SDK 120, may be provided by a payment provider, such as payment provider 130, so that, as described above, existing functionality (e.g., third party application 118) of a merchant mobile device (e.g., merchant device 114) may be modified to include functionality certified by the payment provider 130 in the POS system 118; to provide certification of the POS system 118 for the payment provider 130 that is not modifiable by the merchant 104 and that enables the merchant user 104 of the POS system 118 to accept chip and PIN transaction payments using a payment provider device 110 without certifying the modified POS system 118; and to enable the POS system 118 to drive the payment provider device 110 without an app from the payment provider 130.

At a step 202 of method 200, the third party app 118, as modified by SDK 120 and executing on merchant mobile device 114, may process a chip and PIN transaction between merchant 104 and consumer 102 by a point-of-sale (POS) system 118 executing on the mobile device 114 of merchant 104, in which the mobile device 114, which is connected with payment provider device 110 of payment provider 130 is provided necessary card 112 data from payment provider device 110.

At a step 203 of method 200, the POS system 118, executing on mobile device 114, may communicate with the payment provider device 110, which may be reading a chip and PIN card or magnetic card (e.g., card 112) and may accept a PIN for the chip and PIN transaction that, for example, authorizes use of card 112.

At a step 204 of method 200, the POS system 118, executing on the mobile device 114, may accept the chip and PIN transaction based on the communication of the POS system 118 with the payment provider device 110 and based on using a service of the payment provider 130, in which the POS system 118 may communicate with a server 132 of payment provider 130 via a network 160.

Figure 3:
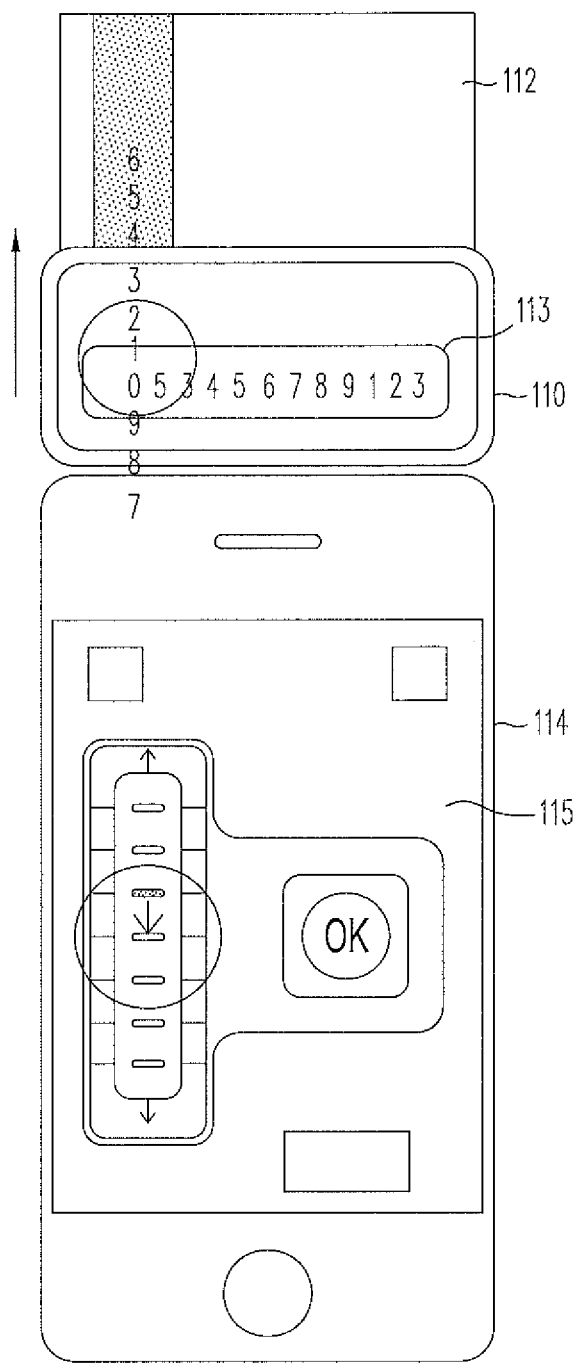
FIG. 3 is a pictorial diagram of a system for providing chip and PIN payment PIN entry, according to an embodiment.

FIG. 3 is a pictorial diagram of a portion of system 100 for providing chip and PIN payment PIN entry, according to an embodiment. As seen in FIG. 3, payment provider device (card reader) 110 may read a card 112 which is inserted or otherwise enabled to be read by card reader 110, which is in communication with (e.g., plugged into as suggested in FIG. 3 or using any of communication means 116 described above with reference to FIG. 1) mobile merchant device 114. One embodiment, as shown, allows the mobile merchant device 114 to provide PIN entry input for card reader 110 without the need for input transducers (e.g., a physical keypad) on card reader 110 itself; as seen in FIG. 3, card reader 110 provides only a display 113 and no keypad, touch screen, or other input device for consumer 102. Display 113 may provide a random number for each digit of the PIN and allow adjusting one digit at a time on the touch screen of mobile device 114 as indicated in FIG. 3. In alternative embodiments, the display may provide various functionalities for accessibility—such as vibrating, sounding, lighting a light emitting diode (LED), or displaying other lights, color, or animation on a screen display to communicate a specific digit or value of a digit. Consumer 102 may use, for example, a touch screen user interface (UI) 115 on mobile device 114 for PIN entry input. The UI 115 may provide an up-down control (as shown in the example of FIG. 3, or a left-right control, for example, in an alternative embodiment) so that no digits are shown on (or "known to") the merchant mobile device (e.g., smart phone) 114. Only a scroll up or down signal is given to card reader 110 and the consumer 102 may indicate with "OK" on the UI to confirm when the card reader 110 is displaying the correct digit. In this way, the PIN can be entered by consumer 102 from mobile device 114 without compromising (communicating) any PIN information from the card reader 110 to the mobile device 114. Thus, security for protecting the PIN arises from only the plug-in reader 110 "knowing" the PIN in order to compare it to the information on the magnetic stripe or chip card 112 being read by the reader 110, and keeping the PIN information away from the merchant mobile device 114 and app 118 the card reader is communicating with. This allows the merchant mobile device 114 to serve securely as PIN entry pad for the card reader.

Figure 4:
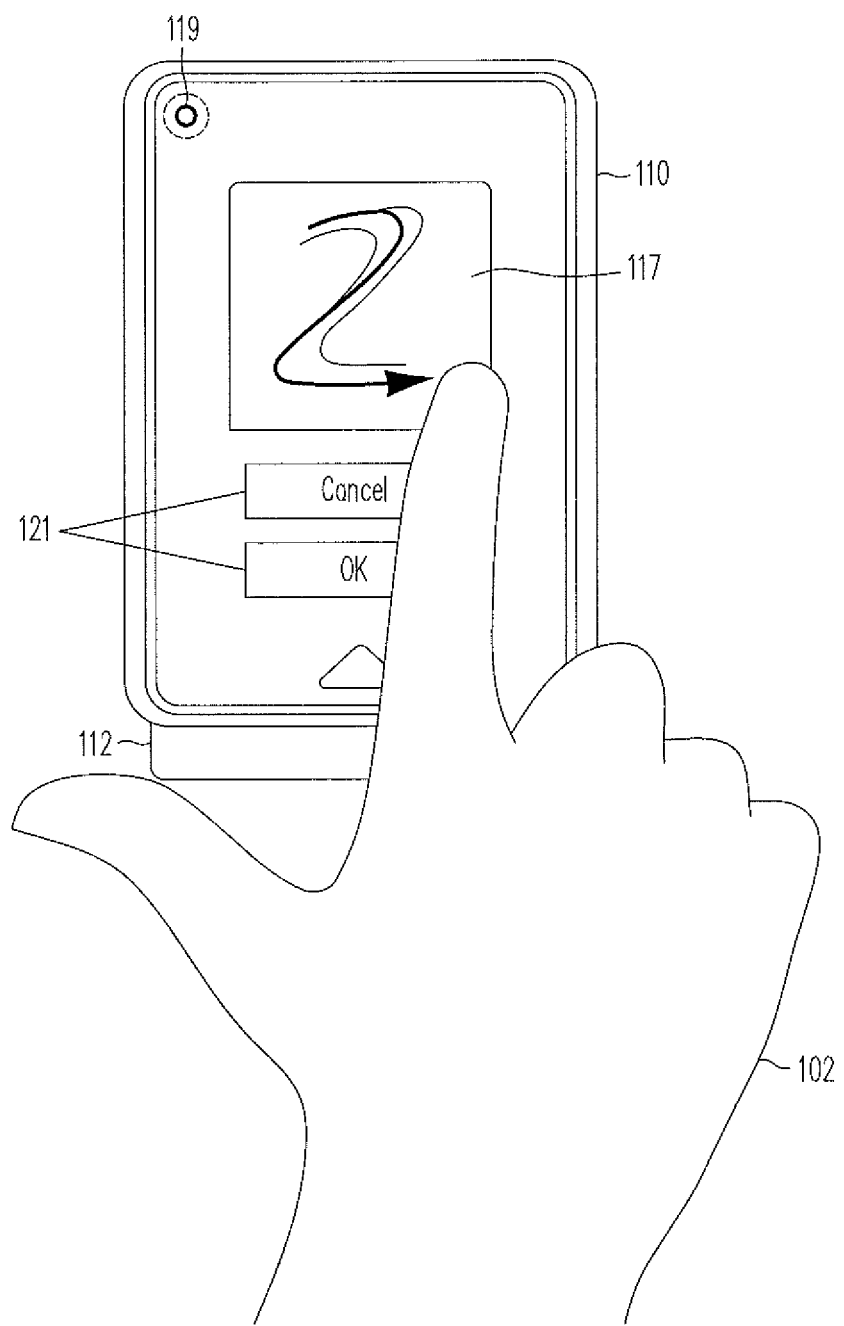
FIG. 4 is a pictorial diagram of a system for providing chip and PIN payment sketch PIN entry, according to an embodiment.

FIG. 4 is a pictorial diagram of a portion of system 100 for providing chip and PIN payment sketch PIN entry, according to an embodiment. As seen in FIG. 4, payment provider device (card reader) 110 may read a card 112 which is inserted or otherwise enabled to be read by card reader 110, which is in communication with (e.g., plugged into) mobile merchant device 114. One embodiment, as shown, allows the card reader 110 to provide PIN entry input in which the PIN may be "hand drawn" or sketched (as opposed to visible digits or PIN) using, for example, a track pad 117 functionality (e.g., touch screen or multi-touch functionality). Moreover, the PIN entry could be not only numeric but anything else—such as letters or sketch objects—and the different types of objects could be combined for extra PIN strength. Visual or other feedback may be provided for consumer 102 from card reader 110, for example, by a transducer 119. For example, transducer 119 may be a light emitting diode (LED). LED 119 may be a multimode or color LED that lights red, for example, to indicate the sketch pad entry is not received and green to indicate the sketch pad entry is recognized. Transducer 119 could produce vibration or audio signals (e.g., sound, voice, chimes) as alternative means of providing feedback. Various items of feedback may also be signaled to mobile merchant device 114 for display by its UI without compromising PIN integrity. Confirmation or repudiation may be provided by consumer 102 to card reader 110 via OK and Cancel buttons 121 which may be, for example, capacitive click fields that react electronically to finger touch by consumer 102. As with the previous example, security for protecting the PIN arises from only the plug-in reader 110 "knowing" the PIN in order to compare it to the information on the magnetic stripe or chip card 112 being read by the reader 110, and keeping the PIN information away from the merchant mobile device 114 and app 118 the card reader is communicating with.

Figure 5:
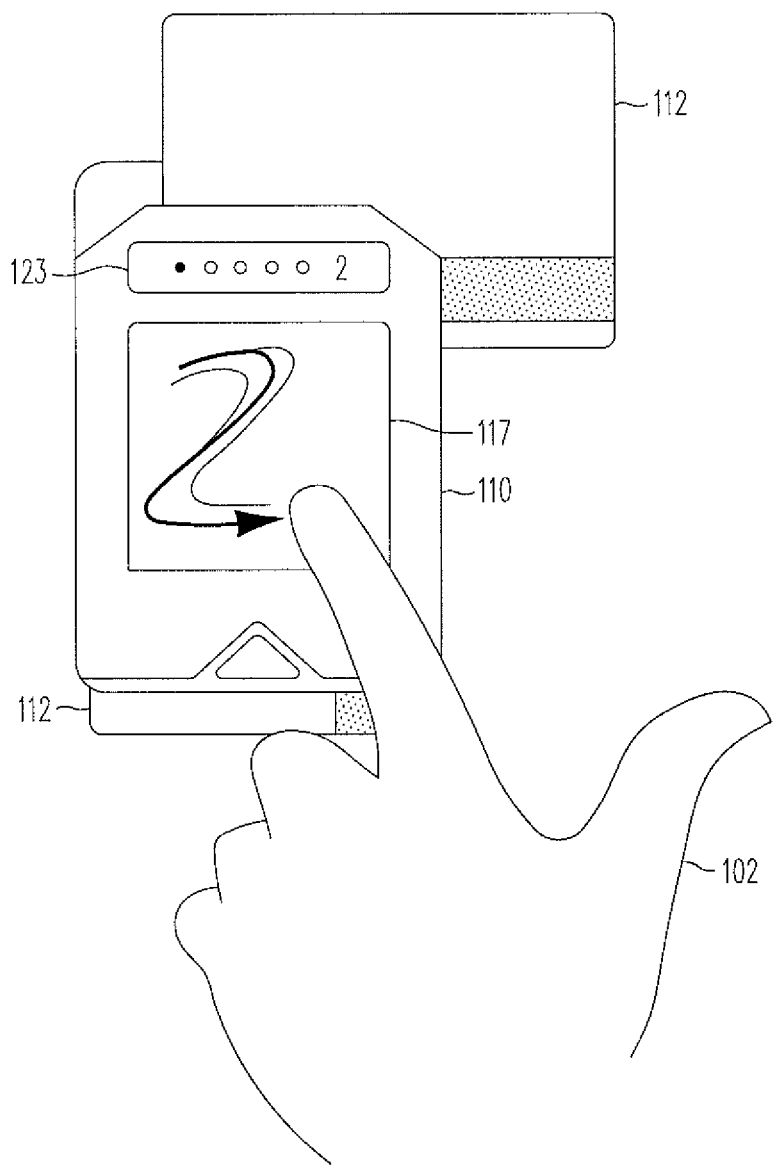
FIG. 5 is a pictorial diagram of a system for providing chip and PIN payment sketch PIN entry, according to another embodiment.

FIG. 5 is a pictorial diagram of a portion of system 100 for providing chip and PIN payment sketch PIN entry, according to another embodiment. As seen in FIG. 5, payment provider device (card reader) 110 may read a card 112 which is inserted or otherwise enabled to be read by card reader 110, which is in communication with (e.g., plugged into) mobile merchant device 114. One embodiment, as shown, allows the card reader 110 to provide PIN entry input in which the PIN may be "hand drawn" or sketched (as opposed to visible digits or PIN) using, for example, a track pad 117 functionality (e.g., touch screen or multi-touch functionality). Moreover, the PIN entry could be not only numeric but anything else—such as letters or sketch objects—and the different types of objects could be combined for extra PIN strength. Visual or other feedback may be provided for consumer 102 from card reader 110, for example, by a display 123. Display 123 may provide, for example, delayed PIN digit masking and simple user flow instructions. Various items of feedback may also be signaled to mobile merchant device 114 for display by its UI without compromising PIN integrity. Confirmation or repudiation may be provided by consumer 102 to card reader 110 via capacitive click fields (not shown in this example) that react electronically to finger touch by consumer 102. As with the previous examples, security for protecting the PIN arises from only the plug-in reader 110 "knowing" the PIN in order to compare it to the information on the magnetic stripe or chip card 112 being read by the reader 110, and keeping the PIN information away from the merchant mobile device 114 and app 118 the card reader is communicating with.

Figure 6:
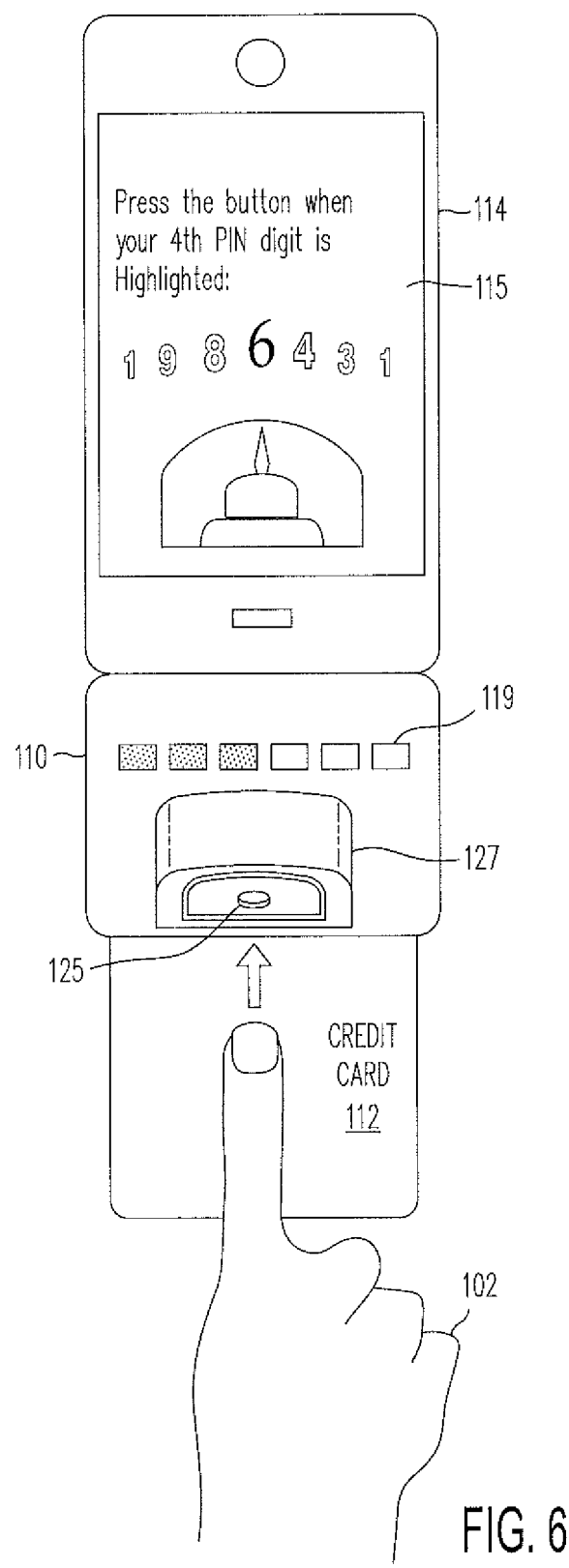
FIG. 6 is a pictorial diagram of a system for providing chip and PIN payment PIN entry, according to yet another embodiment.

FIG. 6 is a pictorial diagram of a portion of system 100 for providing chip and PIN payment PIN entry using a hidden confirm button control, according to yet another embodiment. As seen in FIG. 6, payment provider device (card reader) 110 may read a card 112 which is inserted or otherwise enabled to be read by card reader 110, which is in communication with (e.g., plugged into or wirelessly connected with) mobile merchant device 114. One embodiment, as shown, allows the card reader 110 to provide PIN entry input with assistance from the UI 115 or display on merchant mobile device 114. In this example, random number digits are rotated through on the smartphone (e.g., mobile device 114) display 115. As the correct personal PIN is viewed, it may and then be selected by consumer 102 on the reader payment provider device 110 via a hidden physical select button, while the rotating display continues on the mobile device 114 display 115. In this way, the PIN can be entered by consumer 102 from card reader 110 without compromising (communicating) any PIN information since no indication is given from the card reader 110 to the mobile device 114 as to which digits are being selected. This embodiment provides an example of a simple device architecture in that one physical switch 125 with privacy shield 127 provides security protection for the PIN of consumer 102. Visual or other feedback may be provided for consumer 102 from card reader 110, for example, by a transducer 119. For example, transducer 119 may be a sequence of light emitting diodes (LED), as shown, that may provide status signaling. As with the previous examples, transducer 119 could produce vibration or audio signals (e.g., sound, voice, chimes) as alternative means of providing feedback. Various items of feedback may also be signaled to mobile merchant device 114 for display by its UI without compromising PIN integrity. Confirmation or repudiation may be provided by consumer 102 to card reader 110 via capacitive click fields (not shown in this example) that react electronically to finger touch by consumer 102. As with the previous examples, security for protecting the PIN arises from only the plug-in reader 110 "knowing" the PIN in order to compare it to the information on the magnetic stripe or chip card 112 being read by the reader 110, and keeping the PIN information away from the merchant mobile device 114 and app 118 the card reader is communicating with.

Figure 7:
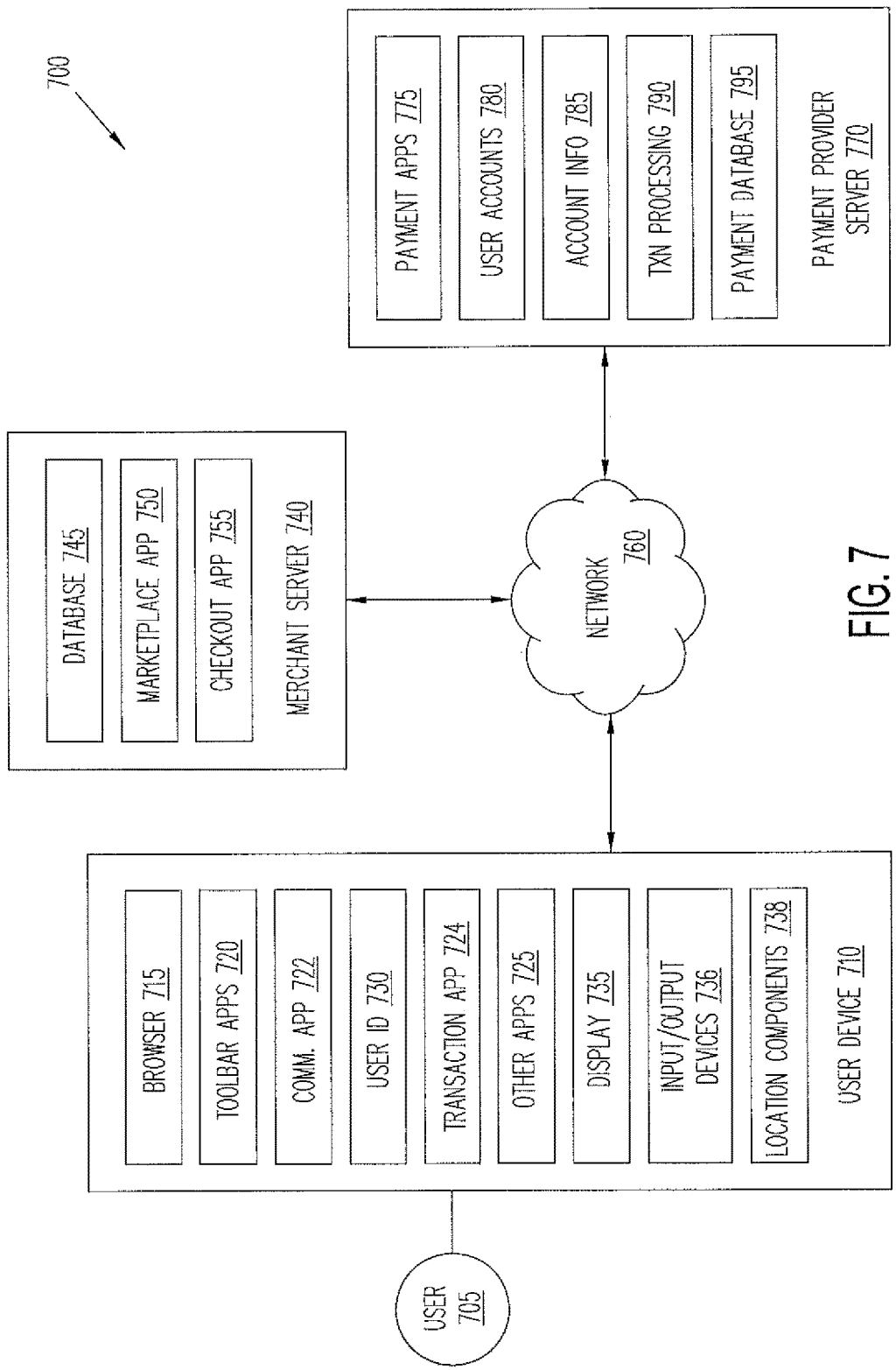
FIG. 7 is a system diagram illustrating a networked system for implementing a process for conducting POS transactions in accordance with one or more embodiments.

FIG. 7, is a system block diagram of a networked system 700 suitable for implementing a process for facilitating a payment (e.g., for a purchase or for conducting POS transactions) according to an embodiment. Networked system 700 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

System 700 may include a user device 710, a merchant server 740, and a payment provider server 770 in communication over a network 760. Payment provider server 770 may be maintained by a payment service provider, such as PayPal, Inc, of San Jose, Calif. A user 705, such as a sender or consumer, utilizes user device 710 to perform a transaction such as an electronic commerce transaction using payment provider server 770. A user 705 may utilize user device 710 to initiate a payment transaction, receive a transaction approval request, or reply to the request. Note that transaction, as used herein, refers to any suitable action performed using the user device, including payments, transfer of information, display of information, purchases, sales, online listings, etc. For example, user 705 may utilize user device 710 to initiate a deposit into at savings account. Although only one merchant server is shown, a plurality of merchant servers may be utilized if the user is purchasing products or services from multiple merchants.

User device 710, merchant server 740, and payment provider server 770 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

Network 760 may be implemented as a single network or a combination of multiple networks. For example, in various embodiments, network 760 may include the Internet or one or more intranets, landline networks, wireless networks, and/or other appropriate types of networks.

User device 710 may be implemented using any appropriate hardware and software configured for wired and/or wireless communication over network 760. For example, in one embodiment, user device 710 may be implemented as a personal computer (PC), a smart phone, personal digital assistant (PDA), laptop computer, and/or other types of computing devices capable of transmitting and/or receiving data, such as an iPad™ from Apple™.

User device 710 may include one or more browser applications 715 which may be used, for example, to provide a convenient interface to permit user 705 to browse information available over network 760. For example, in one embodiment, browser application 715 may be implemented as a web browser configured to view information available over the Internet, such as a user account for setting up a shopping list and/or merchant sites for viewing and purchasing products and services. User device 710 may also include one or more toolbar applications 720 which may be used, for example, to provide client-side processing for performing desired tasks in response to operations selected by user 705. In one embodiment, toolbar application 720 may display a user interface in connection with browser application 715.

User device 710 may include a transaction application 724. Transaction application 724 may be used to receive product information, price information, merchant information or other information from payment provider server 770 and/or merchant server 740. Transaction application 724 may provide transaction information such as items for sale and/or payment options to display 735 for display to a user.

Transaction application 724 may receive device location information and/or device orientation information from location components 738 (e.g., a global positioning system (GPS) component, one or more accelerometers, a compass, Wi-Fi devices, Near-Field Communication (NFC) devices, etc.). The location information may include GPS coordinates, accelerometer data that indicates an orientation of the device and/or movement of the device or other data that indicates the location, position, and/or orientation of the device. User device 710 may determine a current location of user device 710 based on the collected location data. In another embodiment, user device 710 may send the location data to payment provider server 770 and payment provider server 770 may determine a current location of user device 710 based on the location data. The transaction information displayed by display 735 in response to instructions from transaction application 724 may include content that is based on the location information and/or may be displayed a time or at a location on display 735 based on the location information.

User device 710 may include one or more input/output devices 736 (e.g., a keypad, a keyboard, a touch sensitive component, or a camera). For example, input/output devices 736 may include a camera that provides images of background objects (e.g., a continuous video stream of a scene in the field of view of the camera) to transaction application 724 that can be displayed on display 735 with transaction information overlaid on the camera images.

User device 710 may further include other applications 725 as may be desired in particular embodiments to provide desired features to user device 710. For example, other applications 725 may include security applications for implementing client-side security features, programmatic client applications for interfacing with appropriate application programming interfaces (APIs) over network 760, or other types of applications.

Applications 725 may also include email, texting, voice and IM applications that allow user 705 to send and receive emails, calls, and texts through network 760, as well as applications that enable the user to communicate, transfer information, make payments, and otherwise utilize a smart wallet through the payment provider as discussed above. User device 710 may include one or more user identifiers 730 which may be implemented, for example, as operating system registry entries, cookies associated with browser application 715, identifiers associated with hardware of user device 710, or other appropriate identifiers, such as used for payment/user/device authentication. In one embodiment, user identifier 730 may be used by a payment service provider to associate user 705 with a particular account maintained by the payment provider. A communications application 722, with associated interfaces, enables user device 710 to communicate within system 700.

Display 735 may include a touch screen that displays information to user 705 and receives user input from user 705 or display 735 may be a touch insensitive display. Display 735 may be a mobile device display, a projection display that projects images onto a transparent, partially transparent or opaque structure, or may include any other suitable display technology. User device 710 may monitor user input on the touch screen, on any other touch-sensitive device (e.g., a touchpad on a laptop), or using other input components (e.g., a mouse) and may recognize user input for association with transactions, and/or to activate certain functions (e.g., purchase transactions, payment transactions, sales transactions, and listing transactions) based on the displayed transaction information.

Merchant server 740 may be maintained, for example, by a merchant or seller offering various products and/or services. The merchant may have a physical point-of-sale (POS) store front. The merchant may be a participating merchant who has a merchant account with the payment service provider. Merchant server 740 may be used for POS or online purchases and transactions. Generally, merchant server 740 may be maintained by anyone or any entity that receives money, which includes charities as well as banks and retailers. For example, a payment may be a donation to charity or a deposit to a bank account such as a savings account.

Merchant server 740 may include a database 745 identifying available products (including digital goods) and/or services (e.g., collectively referred to as items) which may be made available for viewing and purchase by user 705. Accordingly, merchant server 740 also may include a marketplace application 750 which may be configured to serve information over network 760 to browser 715 of user device 710. In one embodiment, user 705 may interact with marketplace application 750 through browser applications over network 760 in order to view various products, food items, or services identified in database 745.

Merchant server 740 also may include a checkout application 755 which may be configured to facilitate the purchase by user 705 of goods or services online or at a physical POS or store front. Checkout application 755 may be configured to accept payment information from or on behalf of user 705 through payment service provider server 770 over network 760. For example, checkout application 755 may receive and process a payment confirmation from payment service provider server 770, as well as transmit transaction information to the payment provider and receive information from the payment provider (e.g., a transaction ID). Checkout application 755 may be configured to receive payment via a plurality of payment methods including cash, credit cards, debit cards, checks, money orders, or the like.

Payment provider server 770 may be maintained, for example, by an online payment service provider which may provide payment between user 705 and the operator of merchant server 740. In this regard, payment provider server 770 includes one or more payment applications 775 which may be configured to interact with user device 710 and/or merchant server 740 over network 760 to facilitate the purchase of goods or services, communicate/display information, and send payments by user 705 of user device 710.

Payment provider server 770 also maintains a plurality of user accounts 780, each of which may include account information 785 associated with consumers, merchants, and funding sources, such as banks or credit card companies. For example, account information 785 may include private financial information of users of devices such as account numbers, passwords, device identifiers, user names, phone numbers, credit card information, bank information, or other financial information which may be used to facilitate online transactions by user 705. Payment application 775 may be configured to interact with merchant server 740 on behalf of user 705 during a transaction with checkout application 755 to track and manage purchases made by users and which and when funding sources are used. Payment application 775 may be configured to determine the existence of and to manage accounts for user 705, as well as create new accounts if necessary. Payment application 775 may be configured to execute one or more payment transactions in response to receiving and recognizing a drawn pattern from user 705.

A transaction processing application 790, which may be part of payment application 775 or may be separate from application 775, may be configured to receive information from user device 710 and/or merchant server 740 for processing and storage in a payment database 795. Transaction processing application 790 may include one or more applications for processing information from user 705 for processing an order and for payment using various selected funding instruments, including operations for initial purchase and for payment after purchase as described herein. As such, transaction processing application 790 may store details of an order from individual users, including a funding source used, available credit options, etc. Transaction processing application 790 may be configured to execute one or more transactions such as electronic commerce transactions in response to selection of a transaction option in a transaction display from user 705.

One or more of merchant server 740, payment provider server 770, and user device 710 may be used to execute any suitable transaction in response to receiving transaction instructions from a user 705.

Figure 8:
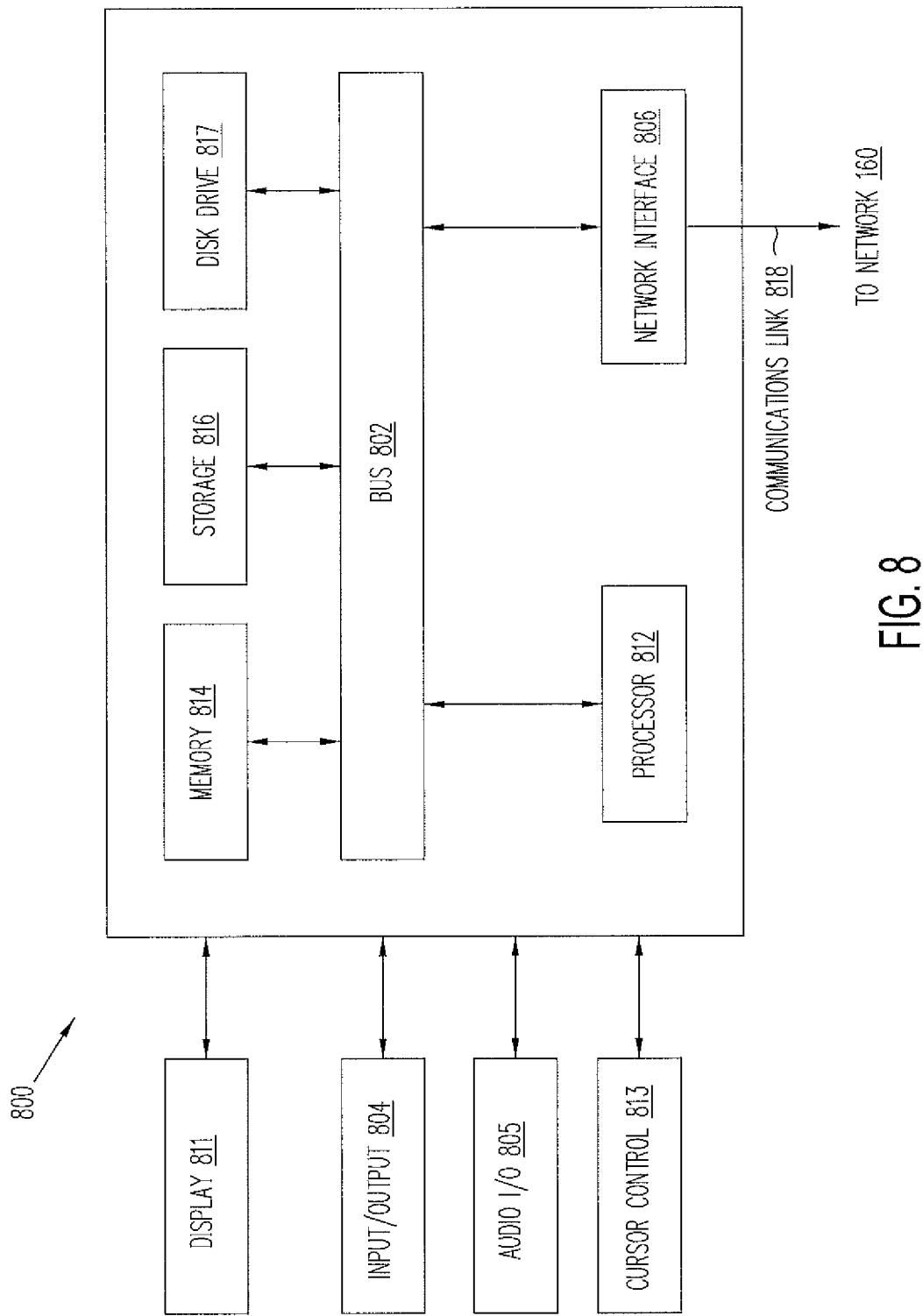
FIG. 8 is a block diagram of an example of a computer system suitable for implementing on one or more devices of the networked system in FIG. 7, according to an embodiment.

FIG. 8 is a block diagram of an example of a computer system 800 suitable for implementing on one or more devices of the networked system in FIG. 7, according to one or more embodiments. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 802. I/O component 804 may also include an output component, such as a display 811 and a cursor control 813 (such as a keyboard, keypad, mouse, etc.). An optional audio input/output component 805 may also be included to allow a user to use voice for inputting information by converting audio signals. Audio I/O component 805 may allow the user to hear audio. A transceiver or network interface 806 transmits and receives signals between computer system 800 and other devices, such as another user device, a merchant server, or a payment provider server via network 160. In one embodiment, the transmission is wireless, although other transmission mediums and methods may also be suitable. A processor 812, which can be a microcontroller, digital signal processor (DSP), or other processing component, processes these various signals, such as for display on computer system 800 or transmission to other devices via a communication link 818. Processor 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor 812 and other components by executing one or more sequences of instructions contained in system memory component 814. Logic may be encoded in a computer readable medium, which may refer to any medium that participates in providing instructions to processor 812 for execution. Such a medium may take many forms, including but not limited to, non-volatile media, volatile media, and transmission media. In various implementations, non-volatile media includes optical or magnetic disks, volatile media includes dynamic memory, such as system memory component 814, and transmission media includes coaxial cables, copper wire, and fiber optics, including wires that comprise bus 802. In one embodiment, the logic is encoded in a non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise faints or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a card reader of a financial service provider coupled to a mobile device of a merchant, wherein the card reader is configured to authenticate a consumer by:
obtaining first authentication credentials of the consumer via accessing a chip and PIN card of the consumer;
receiving, from the mobile device of the merchant, one or more entry input signals, wherein the one or more entry input signals represent individual characters that are automatically rotated and highlighted at random on the merchant's mobile device's display;
receiving one or more consumer interactions with an input mechanism of the card reader while one of the individual characters is highlighted, wherein the one or more consumer interactions confirms a selection of one or more respective characters represented in the one or more received input signals;
determining, based on the one or more entry input signals and the one or more consumer interactions, second authentication credentials of the consumer;
authenticating the consumer based at least on comparing the first authentication credentials and the second authentication credentials;
and communicating, based on the authenticating, a communication signal to the mobile device to enable a third party application of the mobile device to execute a transaction between the merchant and the consumer using a service of the financial service provider.

2. The system of claim 1, wherein the first authentication credentials include a personal identification number (PIN) stored on the chip and PIN card, and wherein the card reader further includes a privacy shield that at least partially covers the input mechanism.

3. The system of claim 1, wherein the card reader is further configured to authenticate the consumer by:
communicating, via a transducer implemented on the card reader, a visual, vibrational, or audio feedback to the consumer as the consumer interacts with the input mechanism.

4. The system of claim 1, wherein:
the third party application comprises a point-of-sale (POS) system of the merchant modified by a software development kit (SDK) of the financial service provider;
and the third party application includes a functionality that is certified by the financial service provider, wherein executing the transaction between the merchant and the consumer includes invoking the functionality of the third party application to communicate with a server of the financial service provider.

5. The system of claim 1, wherein:
the third party application comprises a point-of-sale (POS) system of the merchant modified by a software development kit (SDK) of the financial service provider;
and an SDK modification to the POS system enables the merchant to accept a payment transaction without certifying the modified POS system.

6. The system of claim 1, wherein:
the third party application comprises a point-of-sale (POS) system of the merchant modified by a software development kit (SDK) of the financial service provider;
and the SDK provides a certification of the POS system for the financial service provider that is not modifiable by the merchant and that allows the merchant to accept one or more payments using the service of the financial service provider.

7. The system of claim 1, wherein:
the third party application comprises a point-of-sale (POS) system of the merchant modified by a software development kit (SDK) of the financial service provider;
and an SDK modification to the POS system enables the POS system to drive the card reader of the financial service provider without an app from the financial service provider.

8. A method comprising:
initiating a transaction between a merchant and a consumer by a point-of-sale (POS) system executing on a mobile device of a merchant, wherein the mobile device is coupled to a card reader of a financial service provider;
causing the mobile device to display individual characters, wherein the displaying of the individual characters further includes automatically rotating and highlighting the characters at random;
sending, from the mobile device to the card reader, one or more entry input signals, wherein the one or more entry input signals represent one or more individual characters displayed, rotated, and highlighted on the merchant's mobile device's display;
receiving, at the mobile device from the card reader, a confirmation that the consumer has been authenticated based at least partially on one or more of the submitted entry input signals;
receiving, by the POS system executing on the mobile device, from the card reader, a communication signal to enable a third party application of the mobile device, wherein the communication signal is communicated by the card reader in response to authenticating the consumer;
and executing the transaction between the merchant and the consumer, by the enabled third party application executing on the mobile device, using a service of the financial service provider.

9. The method of claim 8, wherein authenticating the consumer comprises:
obtaining, by the card reader, first authentication credentials of the consumer via accessing a chip and PIN card of the consumer;
and authenticating the consumer, by the card reader, based at least on comparing the first authentication credentials and the authentication credentials obtained through customer interactions with the input mechanism;
and wherein enabling the third party application executing on the mobile device is based at least on the authenticating.

10. The method of claim 8, further comprising:
modifying the point-of-sale (POS) system of the mobile device using a software development kit (SDK) of the financial service provider to generate the third party application of the mobile device.

11. The method of claim 8, further comprising:
modifying the point-of-sale (POS) system of the mobile device using a software development kit (SDK) of the financial service provider to generate the third party application of the mobile device;
including, through the modification by the SDK, a functionality in the third party application that is certified by the financial service provider;
and invoking the functionality of the third party application to communicate with a server of the financial service provider to execute the transaction between the merchant and the consumer.

12. The method of claim 8, further comprising:
modifying the point-of-sale (POS) system of the mobile device using a software development kit (SDK) of the financial service provider to generate the third party application of the mobile device;
and enabling the merchant, through the modification by the SDK, to accept a payment transaction without certifying the modified POS system.

13. The method of claim 8, further comprising:
modifying the point-of-sale (POS) system of the mobile device using a software development kit (SDK) of the financial service provider to generate the third party application of the mobile device;
and providing, through the modification by the SDK, a certification of the POS system for the financial service provider that is not modifiable by the merchant and that allows the merchant to accept one or more payments using the service of the financial service provider.

14. The method of claim 8, further comprising:
modifying the point-of-sale (POS) system of the mobile device using a software development kit (SDK) of the financial service provider to generate the third party application of the mobile device;
and enabling, through the modification by the SDK, the POS system to drive the card reader of the financial service provider without an app from the financial service provider.

15. A method, comprising:
obtaining first authentication credentials of a consumer via a card reader of a financial service provider by accessing a chip and PIN card of the consumer;
receiving, from a mobile device of a merchant that is coupled to the card reader, one or more entry input signals, wherein the one or more entry input signals represent one or more individual characters that are automatically rotated and highlighted at random on the merchant's mobile device's display;

receiving one or more consumer interactions with an input mechanism of the card reader while one of the individual characters is highlighted, wherein the one or more consumer interactions confirms a selection of one or more respective characters represented in the one or more received input signals;

determining, based on the one or more entry input signals and the one or more consumer interactions, second authentication credentials of the consumer;

authenticating the consumer based at least on comparing the first authentication credentials and the second authentication credentials;

and communicating, based on the authenticating, a communication signal to the mobile device to enable a third party application of the mobile device to execute a transaction between the merchant and the consumer using a service of the financial service provider.

16. The method of claim 15, wherein the card reader further includes a privacy shield that at least partially covers the input mechanism.

17. The method of claim 15, wherein each of the one or more consumer interactions confirms a selection of a respective character of the one or more entry input signals.

18. The method of claim 15, further comprising:
modifying, via a software development kit (SDK) of the financial service provider, a merchant point-of-sale (POS) system included the third party application.

19. The method of claim 18, wherein the third party application includes a functionality that is certified by the financial service provider, wherein an executing of the transaction between the merchant and the consumer includes invoking the functionality of the third party application to communicate with a server of the financial service provider.

20. The method of claim 18, further comprising:
providing, via the SDK, a certification of the POS system for the financial service provider, wherein the certification allows the merchant to accept one or more payments using the service of the financial service provider.

21. The method of claim 18, further comprising:
communicating, via a transducer implemented on the card reader, a visual, vibrational, or audio feedback to the consumer as the consumer interacts with the input mechanism.

* * * * *